US008779889B2

(12) United States Patent
Bayne et al.

(10) Patent No.: US 8,779,889 B2
(45) Date of Patent: Jul. 15, 2014

(54) SYSTEM FOR REGULATING ACCESS TO A RESOURCE

(75) Inventors: Christopher Bayne, Oxford (GB); Christopher Butler, Oxfordshire (GB); Leonard Sim, Wokingham (GB)

(73) Assignee: LO-Q PLC., Smith Centre, Fairmile, Henley-on-Thames (GB)

( * ) Notice: Subject to any disclaimer, the term of this patent is extended or adjusted under 35 U.S.C. 154(b) by 624 days.

(21) Appl. No.: 12/291,745

(22) Filed: Nov. 12, 2008

(65) Prior Publication Data

US 2010/0117790 A1 May 13, 2010

(51) Int. Cl.
*G05B 19/00* (2006.01)

(52) U.S. Cl.
USPC .............. 340/5.2; 340/5.1; 340/5.21; 340/5.7

(58) Field of Classification Search
CPC ..... G06Q 10/02; G06Q 10/025; G06Q 30/02; G06Q 30/0209; G06Q 30/0212; G06Q 30/0226; G07C 11/00; G07C 2011/02; G07C 2011/04
See application file for complete search history.

(56) References Cited

U.S. PATENT DOCUMENTS

| | | | | |
|---|---|---|---|---|
| 5,502,806 | A * | 3/1996 | Mahoney et al. | 715/839 |
| 2002/0116235 | A1* | 8/2002 | Grimm et al. | 705/5 |
| 2003/0093167 | A1* | 5/2003 | Sim | 700/90 |
| 2003/0102956 | A1* | 6/2003 | McManus et al. | 340/5.2 |
| 2005/0060173 | A1* | 3/2005 | Hale et al. | 705/1 |
| 2007/0168390 | A1* | 7/2007 | Mardirossian | 707/104.1 |
| 2009/0063205 | A1* | 3/2009 | Shibasaki | 705/5 |
| 2009/0313062 | A1* | 12/2009 | Natsuyama et al. | 705/7 |

FOREIGN PATENT DOCUMENTS

| | | |
|---|---|---|
| EP | 1324248 A2 | 7/2003 |
| JP | 2000163485 | 6/2000 |
| JP | 2002123731 | 4/2002 |
| JP | 2005189921 | 7/2005 |
| JP | 2007011904 | 1/2007 |
| WO | WO 2008/037952 AI | 4/2008 |

OTHER PUBLICATIONS

Office Action from Japanese counterpart application No. 2011-535161. dated Sep. 4. 2013.

Form PCT/ISA/210 International Search Report for PCT/GB2009/002640 mailed Dec. 14, 2009.

Office Action from corresponding Japanese Patent Appl. No. 2011-535161, dated May 9, 2014.

* cited by examiner

*Primary Examiner* — Curtis King
(74) *Attorney, Agent, or Firm* — Koppel, Patrick, Heybl & Philpott

(57) ABSTRACT

A system for regulating access to a resource by a plurality of users is provided. The system comprises: a plurality of portable access keys, each being provided to one of the users and having an associated variable access parameter; an access barrier, having an open state allowing passage through and a closed state denying access to the resource, and defining an access queue; a sensor that determines an access queue characteristic related to a number of users in the access queue; a controller, which sets an access criterion based on the determined access queue characteristic; and a detector, located at the access barrier and which determines the variable access parameter of a portable access key when it is brought into the vicinity of the detector. The controller sets the access barrier in its open state if the variable access parameter determined by the detector meets the access criterion.

20 Claims, 3 Drawing Sheets

SYSTEM FOR REGULATING ACCESS TO A RESOURCE

TECHNICAL FIELD

This invention relates to a system and method for regulating access to a resource, such as an attraction, ride, show or event, as may be found in an amusement park.

BACKGROUND OF THE INVENTION

An amusement park comprises a number of attractions, for example, rides, shows and displays. Each attraction has a limited capacity for people to gain access to it at any specific time. For instance, a ride has only a certain number of seats. It is desirable that access be managed to use the attraction as efficiently as possible and that any regulation of access should be deemed as fair to all users. When more people wish to access the attraction than its instantaneous capacity allows, people who are unable to gain access immediately can be queued.

Physical queue lines are a well known way to manage access. However, the most popular attractions tend to have longer queues for access than less popular attractions. Moreover, potential users of an attraction may become bored queuing in a line. Managing access to a resource efficiently whilst minimising the length of queue line is difficult.

An existing approach divides the people who wish to access the attraction into two groups. A first group of people is arranged into a physical queue at a first access point for the attraction. Each member of the second group of people is informed of an allotted time slot when they can access the attraction. In order to access the attraction, a member of the second group need only be physically present at a second access point for the attraction, at their allotted time slot. Examples of such approaches include U.S. Pat. No. 6,529,786 and US-A-2008/0080445, both of which share common inventors with the present invention. However, sophisticated communications and computational facilities can be required to optimally allocate time slots to the second group of people. Moreover, since the users are separated in two distinct groups, it is difficult to optimise allocation collectively for all users.

SUMMARY OF THE INVENTION

Against this background, the present invention provides a system for regulating access to a resource by a plurality of users. The system comprises: a plurality of portable access keys, each portable access key being provided to one of the plurality of users and having a variable access parameter associated therewith; an access barrier, having an open state allowing passage through the access barrier towards the resource and a closed state denying access to the resource, the access barrier defining an access queue; a sensor, arranged to determine an access queue characteristic, related to a number of users in the access queue; a controller, arranged to set an access criterion for the access barrier based on the determined access queue characteristic; and a detector, located at the access barrier and adapted to determine the variable access parameter of a portable access key brought into the vicinity of the detector. The controller is further arranged to set the access barrier in its open state if the variable access parameter determined by the detector meets the access criterion.

Unlike existing systems, this system does not require a communications network to inform a user as to whether they are able to access a resource, since the controller only sets a criterion and not a specific time for access to the resource. As the variable access parameter changes, the user is able to compare it with the access criterion and thereby determine whether they are able to access the resource. The cost and complexity of the system is therefore reduced.

Since the access criterion is based on a parameter of the access queue, specifically relating to the number of users in the access queue, the access criterion can be set to adjust the number of users in the access queue accordingly. Preferably, the access queue characteristic is indicative of a waiting time of users in the access queue. The average waiting time can therefore be minimised, or set to any appropriate value, depending on other factors. For example, if it is raining and the access queue is uncovered, a short queue waiting time may be preferred. The efficiency of the system is therefore improved.

The system preferably adjusts the variable access parameter associated with the detected portable access key if the access barrier is set to its open state. Advantageously, the portable access key is arranged to store the variable access parameter and is arranged to perform said adjustment.

In the preferred embodiment, each of the plurality of portable access keys comprises a portable module comprising: a memory, arranged to store the respective variable access parameter for the portable module; and a transmitter, arranged to transmit the variable access parameter associated with the portable module. The detector may then comprise a receiver arranged to receive the associated variable access parameter.

Preferably, the system also comprises an entrance barrier, the entrance barrier and access barrier defining the access queue. The sensor may then be arranged to measure the number of users in the access queue. In this case, the sensor may comprise an entrance barrier counter, arranged to count the number of users passing through the entrance barrier and thereby leaving the access queue. The entrance barrier counter may comprise an indicator arranged to be activated when a user passes through the entrance barrier. For example, the indicator may be a switch in a turnstile arrangement, or an optical identifier arranged to identify a person passing through the entrance barrier.

In systems of this type, the sensor may be arranged to measure the number of users in the access queue. This can be achieved by counting the number of users joining the access queue based on the number of times that the access barrier is set to its open state, and by counting the number of users leaving the access queue using the entrance barrier counter. Alternatively, this may be achieved by using a camera to count the number of users in the access queue. Using either approach, a waiting time can then be determined by dividing the number of users in the queue by a throughput for the resource.

In one embodiment, each of the plurality of portable access keys has an associated identifier, and the entrance barrier counter is arranged to count the number of users passing through the entrance barrier using a receiver arranged to receive the associated identifier from a portable access key. Moreover, the detector at the access barrier may comprise a receiver arranged to receive the identifier, and the controller may be further arranged to set the access barrier in its open state if the receiver of the detector receives an associated identifier and the variable access parameter determined by the detector meets the access criterion. Such a system allows the number of users in the access queue to be counted by wireless means at the access barrier and the entrance barrier.

In one embodiment, the entrance barrier may have an open state allowing passage through the entrance barrier and a closed state denying access to the resource. The entrance barrier may then comprise a receiver arranged to receive an identifier from a portable access key and be further arranged to be set in its open state if the identifier is received by the entrance barrier receiver.

In some embodiments, the sensor is arranged to determine the access queue characteristic by measuring the waiting time of at least one user in the access queue. This can be achieved by: determining a start time at which the access barrier was set to its open state for a particular unique identifier; determining an end time at which the entrance barrier was set to its open state for the same unique identifier; and establishing a waiting time by taking the difference between the start time and the end time.

In the preferred embodiment, each of the plurality of portable access keys has an associated unique identifier. When the access queue characteristic is indicative of a waiting time of users in the access queue, this allows the waiting time to be determined on the basis of the number of users in the access queue and a waiting time for an individual user. Advantageously, the waiting time may be determined on the basis of waiting time for a plurality of individual users. Optionally, the controller may be further arranged to set one or more of the access barrier or entrance barrier in its open state if the receiver of the detector receives the unique identifier.

In systems where an identifier is associated with each portable access key, each of the plurality of portable access keys preferably comprises a transmitter arranged to transmit the associated identifier.

Optionally, each of the plurality of portable access keys further comprises a receiver. The entrance barrier may further comprise a transmitter, arranged to transmit an acknowledgement identifier which indicates that the entrance barrier has received the identifier associated with the portable access key. The receiver in the portable access key may then be arranged to receive the acknowledgement identifier and the variable access parameter stored in the memory can then be adjusted accordingly.

In the preferred embodiment, the variable access parameter associated with the portable access key from which the identifier is received at the entrance barrier is adjusted. In this way, the variable access parameter is adjusted when the user gains access to the attraction, beneficially allowing the user to leave the access queue before accessing the attraction without penalty, if they wish.

Optionally, the sensor is arranged to determine a plurality of access queue characteristics, and the controller is arranged to set the access criterion based on the plurality of access queue characteristics.

In the preferred embodiment, the variable access parameter comprises a number. Then, for each of the plurality of portable access keys, the system is arranged to measure the time elapsed since the respective variable access parameter was changed and to increase the respective variable access parameter based on the measured time elapsed. The system is further arranged, for each of the plurality of portable access keys, to repeat at regular time intervals the step of measuring the time elapsed and increasing the respective variable access parameter. This functionality may optionally be provided in each of the plurality of portable modules.

In an embodiment, the variable access parameter comprises a number and the controller is arranged to set the access criterion by determining a threshold and to set the access barrier in its open state if the variable access parameter determined by the detector meets the threshold. Thus, the access criterion comprises a determination that the variable access parameter determined by the detector meets the threshold.

The present invention may also be found in a system for regulating access to a first resource and a second resource by a plurality of users, the system comprising: the system as described above in association with the first resource; a second access barrier, having an open state allowing passage through the second access barrier and a closed state denying access to the second resource, the access barrier defining a second access queue; a second sensor, arranged to determine a second access queue characteristic, the second access queue characteristic being related to a number of users in the second access queue; a second controller, arranged to set a second access criterion for the second access barrier based on the determined second access queue characteristic; and a second detector, located at the second access barrier and adapted to determine the variable access parameter of a portable access key when the portable access key is brought into the vicinity of the second detector. The second controller is further arranged to set the second access barrier in its open state if the variable access parameter determined by the second detector meets the second access criterion. It will be recognised that the second controller may be part of, connected to, or integral with the controller in association with the first resource. Alternatively, the second controller may comprise a separate software or hardware entity in comparison with the controller in association with the first resource.

Further benefits of the system will be apparent when access to more than one resource is regulated. For example, the waiting time of one resource can be traded off against the waiting time of another resource. This improves efficiency of access to resources with significant demand.

In a second aspect, a method for regulating access to a resource by a plurality of users is provided. The method comprises: providing a portable access key to each of the plurality of users, each portable module having a variable access parameter associated therewith; defining an access queue using an access barrier; closing the access barrier so as to deny access to the resource; determining an access queue characteristic, the access queue characteristic being related to a number of users in the access queue; setting an access criterion for the access barrier based on the determined access queue characteristic; determining the variable access parameter of a portable access key when the portable access key is brought into the vicinity of a detector in the access barrier; and opening the access barrier, to allow passage through the access barrier, if the variable access parameter determined by the detector meets the access criterion.

In a third aspect, an alternative method of regulating access to a resource by a plurality of users. The alternative method comprises: defining a plurality of variable access parameters, each variable access parameter being associated with a respective user from the plurality of users; determining an access queue characteristic, the access queue characteristic relating to a number of users wishing to access the resource who are waiting in an access queue; and allowing a user from the plurality of users to access the resource if the variable access parameter for said user meets an access criterion, the access criterion being based on the determined access queue characteristic, to thereby regulate access to the resource. In an embodiment of this alternative method, the access queue is defined by an access barrier and the step of allowing a user to access the resource comprises opening the access barrier.

Either method may optionally further comprise adjusting the variable access parameter for a user passing through the opened access barrier.

In some embodiments, the variable access parameter comprises a number, and the method further comprises: measuring, for each of the plurality of users, the time elapsed since their respective variable access parameter was changed; and increasing, the variable access parameter for each of the plurality of users, based on the respective measured time elapsed.

BRIEF DESCRIPTION OF THE DRAWINGS

The invention may be put into practice in various ways, a number of which will now be described by way of example only and with reference to the accompanying drawings in which.

DESCRIPTION OF PREFERRED EMBODIMENTS

Figure 1:
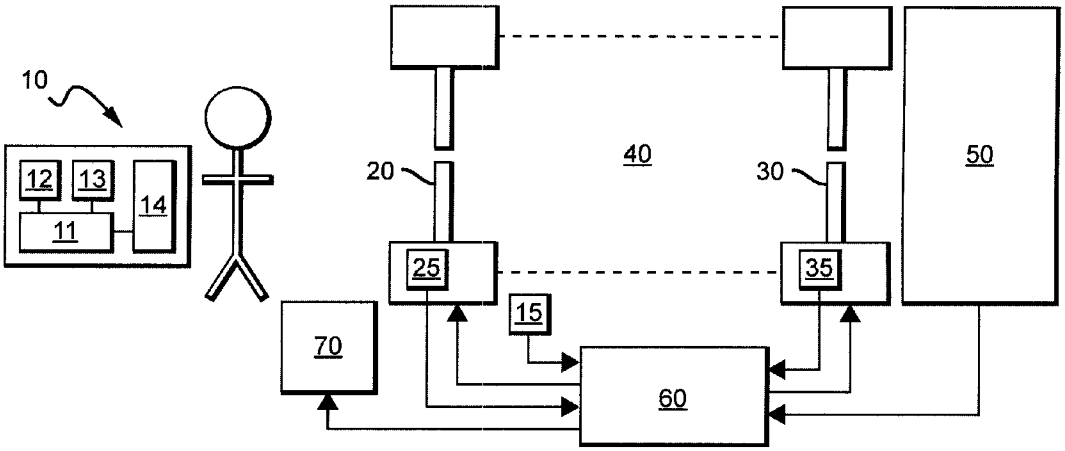
FIG. 1 shows a first embodiment of the present invention.

Referring first to FIG. 1, there is shown a first embodiment of the present invention. Each user is provided with a portable module 10. The user wishes to visit attraction 50. An access barrier 20 and an entrance barrier 30 are provided. The access barrier 20 and the entrance barrier 30 define an access queue 40. The access queue 40 can be further defined by other fences or barriers. Users wishing to use the attraction 50 must pass through access barrier 20 and entrance barrier 30 before reaching the attraction 50. The access barrier 20 has at least two states: a first, open state in which users can pass through the access barrier 20; and a second, closed state, in which the access barrier 20 prevents users from passing though. Similarly, the entrance barrier 30 has at least two states: a first, open state in which users can pass through the entrance barrier 30; and a second, closed state, in which the entrance barrier 30 prevents users from passing though.

The respective states of access barrier 20 and entrance barrier 30 are controlled by controller 60. The access barrier 20 comprises first detector 25 and the entrance barrier 30 comprises second detector 35.

Each portable module 10 comprises a processor 11, a memory 12, a transceiver 13, and a display 14. The memory 12 stores the variable access parameter associated with that portable module 10. The display 14 is configured to display the variable access parameter, which is a number. The transceiver 13 transmits an identifier, which is unique to that portable module 10. The transmitter 13 also transmits the access parameter and number of users associated with the portable module 10.

The portable module processor 11 manages the variable access parameter, which is increased with increasing time. For instance, for each minute that the portable module processor is operative, the variable access parameter is increased by one unit.

When detector 25 receives the transmission of a unique identifier and a variable access parameter from a portable module 10, it passes this information to controller 60. Controller 60 compares the variable access parameter against an access criterion. If the access criterion is met, controller 60 then sets the access barrier 20 to its open state to allow the user carrying the portable module 10 to pass through. Controller 60 stores the unique identifier together with an associated indication of the time that the user entered the access queue 40. Once the sensor 15 detects that the user has passed through, the access barrier 20 is closed again. If the access criterion is not met, the access barrier 20 is not opened and remains in its closed state.

A user passing through the access barrier 20 joins access queue 40. When the user reaches the entrance barrier 30 and if there is capacity available on the attraction, detector 35 receives the transmission of the unique identifier from the portable module 10. In response, it passes this information to the controller 60. Controller 60 stores an indication of the time that the user left the access queue 40 and associates this indication together with the unique identifier relating to that user.

Controller 60 is thereby able to determine the number of portable modules between the access barrier 20 and the entrance barrier 30 and therefore in the access queue 40. This can be used to determine an estimated waiting time for users in the access queue 40. The throughput can be determined by analysing the number of users passing through the entrance barrier 30 over a predetermined time period. Then, a waiting time is calculated by dividing the number of people in the queue by the throughput. A waiting time determined in this way changes dynamically based on the current arrival rate and throughput in the access queue.

Over time, the probability of an error being introduced into the number of portable modules in the access queue 40 determined by the controller 60 increases. This occurs because of the possibility that the access barrier 20 or entrance barrier 30 register portable modules multiple times or not at all. Consequently, an error may also be introduced into the waiting time determined as described above (hereinafter referred to as a first waiting time).

An individual waiting time is also determined for each user, using the time difference between the stored indication of the time that the user entered the access queue 40 and the stored indication of the time that the user left the access queue 40. A waiting time determined in this way is specific to the user and relates to the waiting time that users experience when the user joined the access queue. This leads to a plurality of individual waiting times being established. A second waiting time may be determined by calculating an average of these plurality of individual waiting times. The second waiting time is also susceptible to errors, due to the possibility of different behaviour by different users in the access queue 40, which may skew this average.

This second waiting time can be compared with the first waiting time. A third waiting time can be set thereby, which is based on the first waiting time, adjusted on the basis of the difference between the first waiting time and the second waiting time. This third waiting time is used for setting the access criterion and thereby reduces the error in the determined waiting time and improves stable control of the access queue.

When the controller 60 determines the presence of a portable module 10, the portable module transceiver 13 receives a transmission from detector 25 that the entrance barrier 30 is opened, and in consequence, the portable module processor 11 reduces the variable access parameter to zero.

The entrance barrier 30 is opened when the attraction is available to accept new users. The entrance barrier 30 is set in a locked state by default, so that it cannot be set into an open state and no user can pass through and gain access to the attraction. When capacity on the attraction is available and the attraction is ready to receive users, the entrance barrier 30 is unlocked. Once unlocked, the entrance barrier will open when presented with a portable module 10, as explained above. When enough guests have passed through to fill the capacity of the attraction, the entrance barrier 30 is again locked.

The controller 60 periodically sets the access criterion on the basis of the determined third waiting time for users in the access queue 40. The access criterion is a threshold, the level of which is set proportionately to the third waiting time. For example, if the waiting time increases, the threshold level is also increased. Conversely, the threshold level is reduced if the waiting time decreases.

In this way, long waiting times in the access queue 40 can be mitigated by reducing the number of users who are able to join the access queue 40. The access criterion, in the form of the threshold level, is displayed on public display 70. Public display 70 is provided with this information by controller 60. This informs users of the access criterion, which they can themselves compare with the variable access parameter displayed on display 14 of the portable module 10. The display 14 and public display 70 thereby prevents users from needing to test whether their variable access parameter meets the access criterion by using detector 25 at access barrier 20.

Figure 2A:
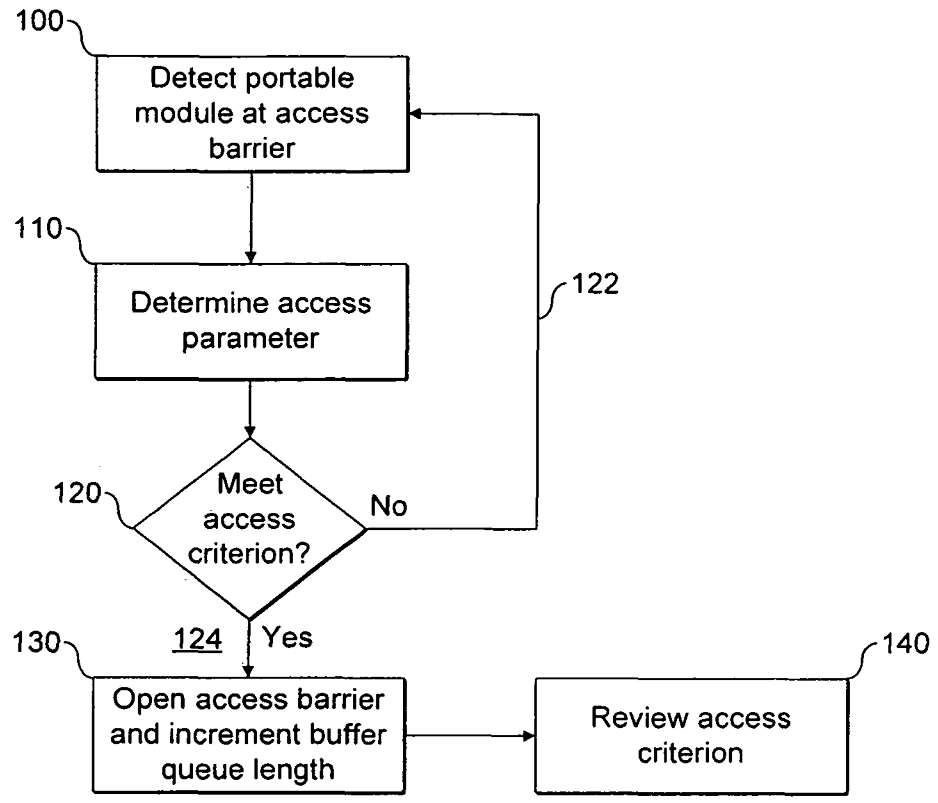
FIG. 2A shows a flowchart illustrating the operation of a processor in controlling an access barrier as shown in FIG. 1.

Referring now to FIG. 2A, there is shown a flowchart illustrating the operation of the controller 60 in controlling the access barrier 20. At step 100, a portable module is detected at access barrier 20. At step 110, the variable access parameter associated with the portable module is determined. At step 120, the variable access parameter is compared with the access criterion. If the access criterion is not met, path 122 is taken and the access barrier remains in its default, closed state. If the access criterion is met, path 124 is taken, leading to step 130. At this step, the access barrier is opened and the processor appropriately increments the stored number of users in access queue 40. Finally, at step 140, the access criterion is reviewed in view of the new access queue length and consequent new waiting time.

Figure 2B:
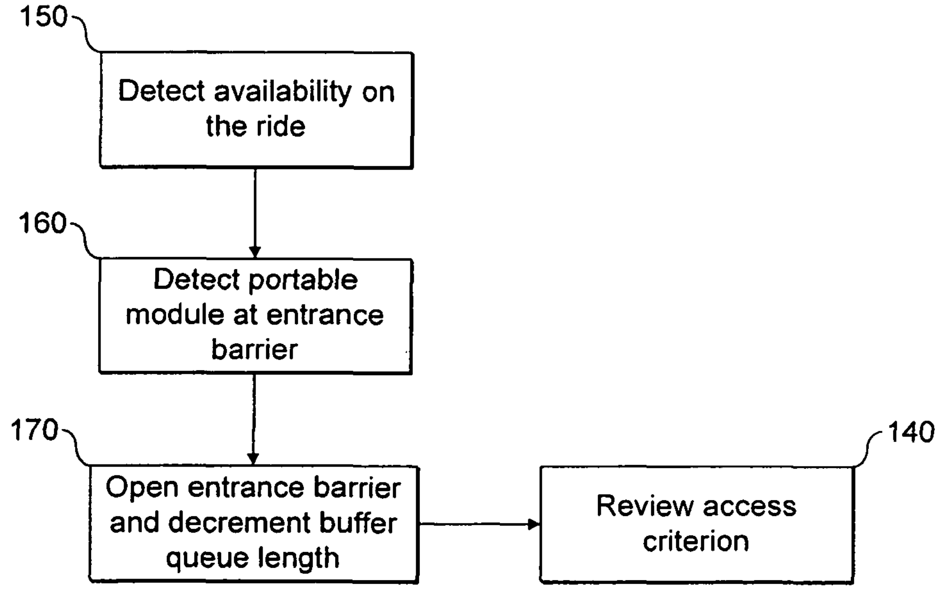
FIG. 2B shows a flowchart illustrating the operation of the processor in controlling an entrance barrier as shown in FIG. 1.

Referring next to FIG. 2B, there is shown a flowchart illustrating the operation of the processor 60 in controlling the entrance barrier 30. At step 150, availability on the attraction 50 is detected. If there is no availability on the attraction 50, then no users will be admitted to it. At step 160, a portable module is detected at entrance barrier 30. Any portable module detected at entrance barrier 30 is already within access queue 40. Then, entrance barrier 30 is set to its open state and the processor appropriately decrements the stored number of users in access queue 40. Finally, at step 140, the access criterion is reviewed in view of the new access queue length and consequent new waiting time.

Figure 3:
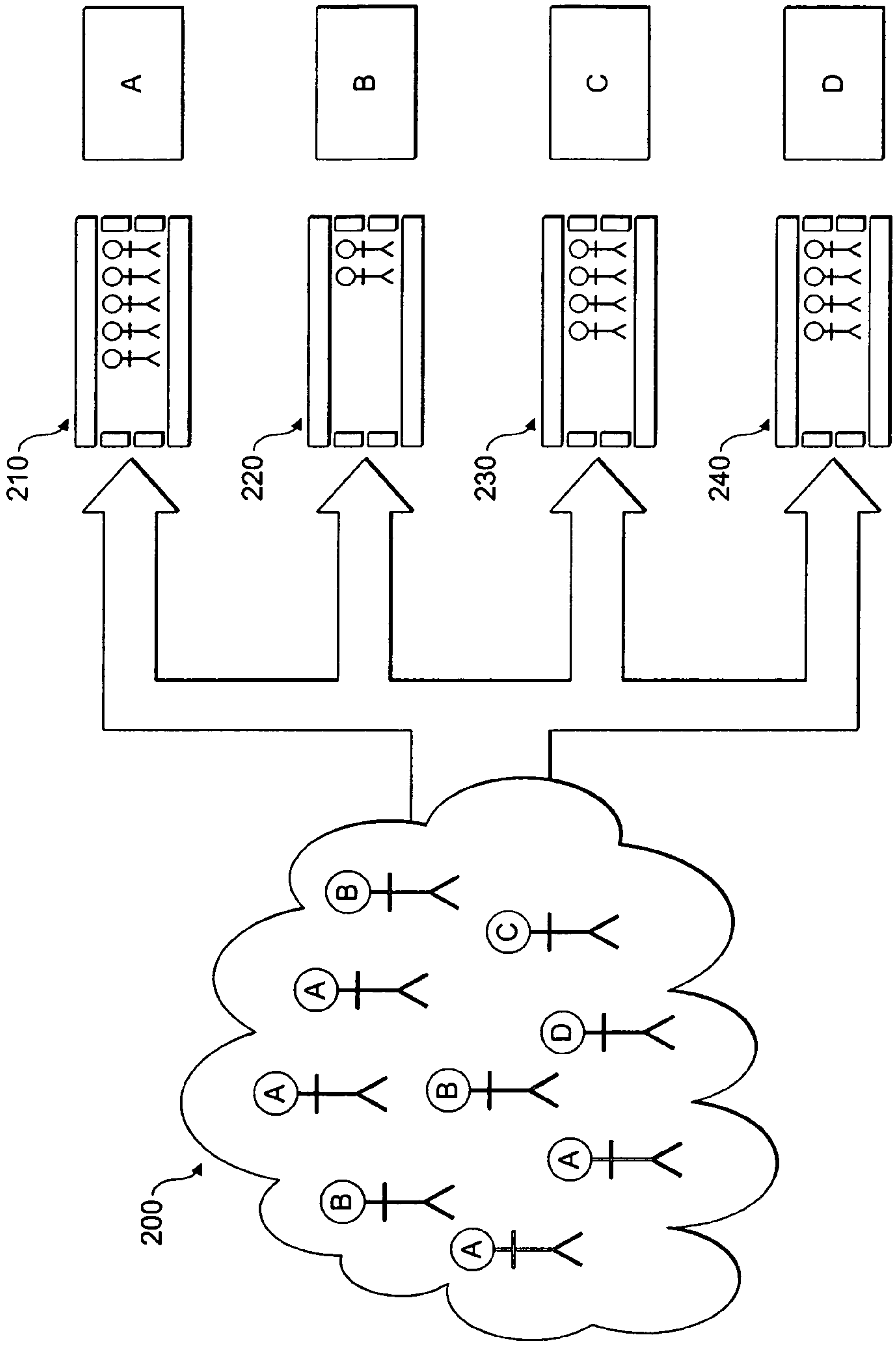
FIG. 3 shows a schematic diagram illustrating the system shown in FIG. 1 as applied to multiple attractions.

Referring now to FIG. 3, there is shown a schematic diagram illustrating the system shown in FIG. 1 as applied to multiple attractions, such as in an amusement park. A waiting area 200 is provided, which may be physically large. For example, waiting area 200 may include all public areas of an amusement park, including shops, restaurants, eating areas, etc. Users not using any of the attractions or waiting in any of the access queues wait here. Four attractions are shown: A, B, C and D. Attraction A is associated with first access queue 210. Attraction B is associated with second access queue 220. Attraction C is associated with third access queue 230, and attraction D is associated with fourth access queue 240.

Figure 4:
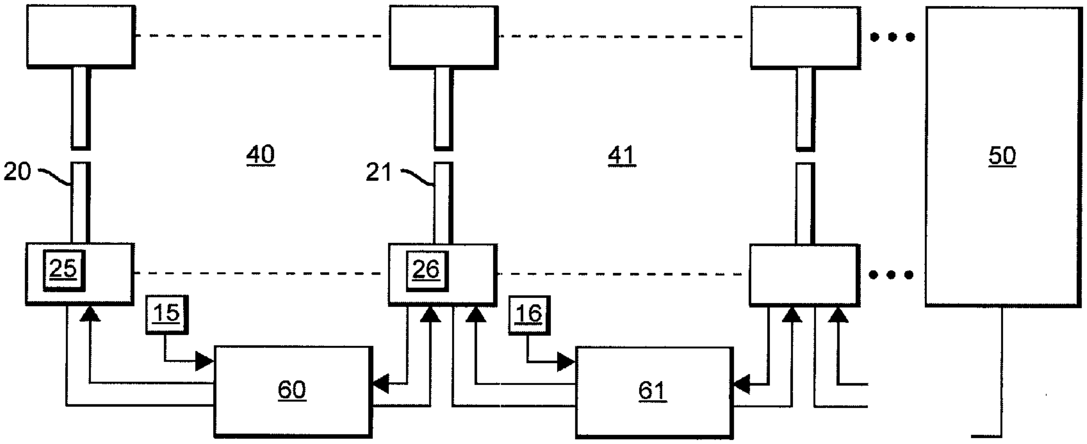
FIG. 4 shows a schematic diagram illustrating the system shown in FIG. 1 when applied in series, so as to accommodate multiple access queues within the same attraction.

Referring now to FIG. 4, there is shown a schematic diagram illustrating the system of FIG. 1 when applied in series, so as to accommodate multiple access queues within the same attraction. The first access barrier 20 defines the first access queue 40. The first detector 25 is located at the first access barrier 20. The first sensor 15 determines a first access queue characteristic. The first controller 60 sets a first access criterion for the first access barrier 20 based on the first access queue characteristic. The second access barrier 21 defines the second access queue 41. The second detector 26 is located at the second access barrier 21. The second sensor 16 determines a second access queue characteristic. The second controller 61 sets a second access criterion for the second access barrier 21 based on the second access queue characteristic. Users must pass through the access barriers before reaching the attraction 50.

For schematic purposes, the attraction that each user in the waiting area 200 will eventually access is indicated by the letter associated with that user. Although the attraction that the user will eventually access is indicated, each user does not provide any such indication to the system until the portable module associated with the user is brought into the vicinity of the access barrier 20 associated with that attraction. Whilst in the waiting area 200, the portable module associated with each user has a processor 11 which increases the variable access parameter associated with that portable module with time. When the user observes that the variable access parameter of their portable module meets the access criterion for the attraction that they wish to access, they go to the access barrier for the appropriate access queue.

The movement of guests between attractions in a theme park is a type of queuing network. Rides, entrances, exits, and other attractions within the park are the nodes of this network. In queuing theory, this network is an example of a “Non-Jackson Network” (for example as defined in “Fundamentals of Queuing Theory”, 3rd Edition, Gross & Harris, Section 4.6). It deviates from being a “Jackson Network” primarily because the routing probabilities are state dependent; the probability of choosing each attraction is significantly influenced by the queue length for that attraction, and to a lesser extent by the queue lengths for the other attractions.

In a typical amusement park, there can be tens of nodes, and thousands of possible users of the attractions at any one time. Using the analytical approach of writing a stochastic balance equation for each state of the network would lead to an extremely large number of equations. For practical purposes, the most effective way to analyse this network is by means of simulation on a digital computer. This allows the candidate control algorithm to be tested against various user behavioural models.

Whilst a preferred embodiment has been described above, the skilled person will recognise that the present invention can be implemented in a number of alternative ways. For example, although in the system above each user is provided with an individual portable module, alternatively, a group of users may be provided with a single portable module 10 and the portable module 10 stores the number of users associated with it in its memory 12. Then, the portable module can transmit this information to detector 25 and detector 35 as appropriate, such that the controller 60 is able to determine the number of users in the access queue 40.

The skilled person will understand that each portable access key need not have an associated unique identifier. Rather, multiple portable access keys may share a common identifier, which can be detected to cause the access barrier or entrance barrier or both to be set to its open state. The common identifier may be one or more of: a number; text; a data sequence; a code; an image; or a sound, and it may be detected using one or more of: wireless; audio; optical; or wired communication.

Alternatively, the portable access key need not have an associated identifier. Also, the entrance barrier need not have a closed state or an open state. Rather, the entrance barrier may comprise a counter which counts the number of people passing through the entrance barrier. Such a counter may be a switch in a turnstile arrangement, which identifies the event of a person passing through the entrance barrier. Alternatively, the counter may be an optical indicator, which identifies the event of a person passing through the entrance barrier. Other such counters to indicate that a person has passed through the entrance barrier will be apparent to the skilled person. It will be understood that although the variable access parameter is set to zero when the user passes through the entrance barrier 30, alternative approaches might be considered. For example, the variable access parameter may be reduced by the threshold level, or some other value. This value may be dependent on one or more of: the threshold level; the current time; the nature of the attraction; the weather; and the total number of users in the amusement park. Alternatively, the variable access parameter may be set to zero when the user passes through the access barrier 20. In some embodiments of the invention, an entrance barrier 30 may not be used or even required.

The skilled person will appreciate that other techniques may be considered for setting the access criterion based upon a waiting time for the users in the access queue described above. For example, although in the foregoing, the variable access parameter is described as a number and the access criterion a threshold, other implementations might be considered. For example, the variable access parameter may be a set of discrete levels and the access criterion may select one or more of these levels.

Advantageously, the waiting time relates only to the time duration spent by users from entry to the access queue until leaving the access queue. The skilled person will understand that although one means for determining a waiting time using the access barrier 20, and optionally the entrance barrier 30, has been described above, other techniques are possible. For example, only the first waiting time or only the second waiting time (as described above) may be used. The first waiting time may be determined using turnstiles to form the access barrier 20 and the entrance barrier 30 and by counting the number of times that each turnstile allows a user to pass through.

The second waiting time may be determined using a form of statistical analysis based on the plurality of individual waiting times, or by just selecting one individual waiting time. Alternatively, other methods of determining a waiting time may be employed.

For example, a camera may be used to obtain an image of at least part of the access queue and to determine a waiting time thereby. More than one such means may be used to provide further alternative values for the waiting time. For example, a camera may be used in addition to the technique described previously by counting passage through the access barrier 20 and optionally the entrance barrier 30.

A further example may use additional technology. If each portable module comprises position determining means, these may be used to report the location of the portable module within the access queue to a central server. The central server can thereby determine the number of portable modules in the access queue and a waiting time, thereby.

A combination of the two (or more) values obtained can then be used in determining the waiting time or setting the access criterion or both. Alternatively, one or more of the determined waiting times can be adjusted on the basis of a waiting time determined in a different way. This mitigates any problems due to errors in determination of the waiting time using a single method.

Although the throughput may be determined using the entrance barrier 30, alternatively the attraction 50 may have a determinable or known throughput.

The skilled person will recognise that the access criterion may be determined without the need to determine the waiting time, but rather on the basis of one or more parameters of the access queue, related to the number of users in the access queue. This may be termed an access queue characteristic. For example, the access criterion may be determined on the basis of the throughput of users through the access queue, the rate of arrival of users into the access queue, the total physical weight of the users in the access queue or the length of the occupied section of the access queue.

It will be understood that the access criterion may be set using other factors, in combination with an access queue characteristic. These could include one or more of: the number of users in the amusement park; the type of users; type of attractions; the specific attraction to which the access criterion relates; the attraction reliability; the physical characteristics of the user (for example, height or weight); the weather; the time and date; public and school holidays; tolerance parameters; and other variables that may influence user behaviour. The portable module may be configured to store additional information, such as physical characteristics. Some attractions have a height or weight restriction, which may form part of the access criterion.

Controllers based on queuing theory, or control system algorithms may be considered. For example, a proportional-integral-derivative controller (PID controller) might be considered. The optimum tuning for a PID controller will be dependent on the number of users in the amusement park. To take account of this, gain-scheduling may be employed, whereby a family of PID controllers is employed each tuned for a specific population range. Typical input constraints for a PID algorithm may include one or more of: that the threshold level should not be set below a specified minimum; that the threshold level rate of increase should not exceed specified maxima; and that the threshold level rate of decrease should not exceed a specified maximum.

It may be desired to optimize the controller in other ways, such as to restrict the range and rate of change of the threshold level in the presence of various user behaviours. These behaviours could be due to external influences, random, or deliberate strategies on the part of the guest.

The access criterion need not be based on just one waiting time for users in the access queue 40. The access criterion may be determined by considering multiple waiting times, for instance historical waiting times for that attraction, or current or historic waiting times for other attractions. In some cases, only historic waiting times may be used, such as a weighted average of previous waiting times over a specific time period. This could be useful, for instance, in mitigating effects from large groups of users desiring to access the attraction in an unpredictable manner and thereby causing the threshold level to change frequently. An example way to mitigate this effect may use a linear controller in the form of, or equivalent to, a weighted sum of past access queue waiting times and threshold levels. The controller may use other external variables to modify the threshold level, such as those described previously. Hysteresis of the threshold level might also be considered to further mitigate these effects.

Other alternatives include: a controller utilizing a combination of linear and non-linear techniques; a controller utilizing a combination of closed-loop and open-loop techniques. The controller may be implemented in many different ways, for example: as a mechanical device; as an analogue electronic device; or as a digital electronic device.

Either a central server or the portable module may count the number of attractions accessed. This allows for the option of a lower cost entry ticket with an entitlement to just a single attraction, a limited number of attractions or specific attractions.

Terminals may be provided at which users could use their portable modules to determine for which attractions their current variable access parameter would make them eligible. The terminal determines the variable access parameter associated with the portable module (in the same way as the access barrier) and identifies the access criterion for each attraction in the amusement park to provide an indication of the attractions for which the associated user is eligible. Such terminals may be combined with the standard attraction status displays, so that normally they show all the attraction thresholds (criteria). When a portable module is presented at the terminal they could then briefly highlight just the eligible attractions.

It is understood that the access barrier 20 and entrance barrier 30 may be set into their respective open and closed states in an automatic fashion, for example using electronic control with motors. Alternatively, the respective open and closed states may simply be indicated to an operator, who manually opens and closes the barrier accordingly.

A physical barrier, for either or both of the access barrier 20 and entrance barrier 30 need not be provided. An operator, a sign or another type of indicator can indicate whether access is provided (i.e. open) or denied (i.e. closed). This indication could be aural or visual, for example. In other words, the barrier need only comprise means to indicate an open or closed state.

Similarly, the access barrier 20 or the entrance barrier 30 need not be required to receive a unique identifier before opening. Rather, detection of a portable access key may be sufficient to trigger opening of the access barrier 20 or entrance barrier 30.

A further alternative is manual operation. An operator chooses a suitable threshold level on the basis of an access queue characteristic and informs the guests by writing the threshold on a blackboard, or other equivalent method. Alternatively the guests may be informed verbally.

In an alternative embodiment, the portable module processor 11 may have two modes: an initialisation mode; and a waiting mode. When the portable module processor 11 is in the initialisation mode, the variable access parameter is set to zero. This mode is used, for example, when the portable module is first given to a user. When the portable module processor 11 is in the waiting mode, the variable access parameter is increased with increasing time. For instance, for each minute that the portable module processor is operative, the variable access parameter is increased by one unit. This mode is used, for example, when the user wishes to use the attraction 50, but has not yet passed through the access barrier 20, or has exited from the entrance barrier 30. When the portable module transceiver 14 receives a transmission from detector 25 that the entrance barrier 30 is opened, the portable module processor 11 may be set to its initialisation mode to reduce the variable access parameter to zero. The portable module processor 11 is then set to its waiting mode.

In a further alternative embodiment, the portable module processor 11 may have three modes: an initialisation mode; a waiting mode; and an access mode. The initialisation mode and waiting mode are as described above. When the portable module processor is in the access mode, the variable access parameter is not increased. This mode may be used, for example, when the user has passed through the access barrier 20, but has not yet exited from the entrance barrier 30. When the access barrier 20 is opened, the portable module transceiver 13 receives a transmission from detector 25 to indicate this and in consequence, the portable module processor 11 is set to its access mode.

The skilled person will further understand that an alternative, but functionally equivalent variant of the present invention may be implemented using paper tickets instead of portable modules. Instead of each individual portable module storing the variable access parameter for the user, the paper ticket would simply provide an indication of the variable access parameter, allowing the user to identify the exact value of the variable access parameter for themselves. The following embodiment is an example of the way that such an approach could be implemented.

On arrival at the amusement park, each user is provided with a ticket indicating a time of issue and a barcode. The barcode represents the time of issue and indicates a unique identification code for the ticket. The variable access parameter for the user is defined by time difference (for example in minutes) between the current time from the time of issue for the ticket. A global timer is provided to provide a common reference point for both ticket issue times and the current time.

In common with the previously described embodiment, each user can pass through the access barrier of an access queue when the variable access parameter is at least at the threshold level for the attraction. The threshold level can be defined in time units, for example minutes. In practice, this can be communicated to the user in a simple way. The public display for each attraction shows a time earlier than the current time by an amount equal to the threshold level. The guests can then understand that access to the attraction is available to them provided that the time on their ticket is no later than the time indicated on the public display.

On arriving at an access barrier for an attraction, the user provides their current ticket. The detector at the access barrier comprises a barcode reader which thereby detects the variable access parameter and unique identifier. If the access criterion is met, the barrier is then opened automatically. Alternatively, an operator could check each ticket and open the barrier manually.

The access barrier may comprise means to retain the ticket if the access barrier is opened. For instance, the ticket may need to be inserted into a slot for checking. Then, the entrance barrier may comprise a simple turnstile, which thereby identifies the number of users leaving the access queue. Alternatively, the entrance barrier may comprise a barcode reader to detect a ticket and then the entrance barrier would comprise means for retaining the ticket.

When the user exits the attraction, they are provided with a new ticket, in a similar way to the originally provided ticket, the new ticket indicating its time of issue. The new ticket could then be used in the same way as the originally provided ticket. The rest of the system would be identical to the previously described embodiment.

The skilled person would appreciate that instead of using the real time, other units may be used. For example, a global clock may be provided indicating an increasing number of time units, for example minutes, from the time at which the park opened. Tickets would then be issued with the value of the global clock at the time of issue. Alternatively, the global clock may be provided indicating a decreasing number of time units, for example minutes, until the time at which the park will close. Tickets would then be issued with the value of the global clock at the time of issue.

In an alternative embodiment, the access key provided to the user need not specifically indicate the variable access parameter. Instead, the access key may provide only a unique identifier; the variable access parameter associated with that access key is stored and updated in a central server. For example, each user may be provided with a wristband. Each wristband has an associated unique identifier, which is linked to a corresponding variable access parameter stored on the central server.

The wristband is provided with a barcode to indicate the associated unique identifier. Then, when arriving at an access barrier, the detector scans the barcode to receive the unique identifier and communicates with the central server in order to determine the corresponding variable access parameter. The user may determine their own variable access parameter by using a terminal which may be provided for that purpose, and which comprises a barcode reader and is able to communicate with the central server to determine the variable access parameter. In all other respects, the system is identical to any of the systems previously described, or variations or combinations thereof.

Although the use of a barcode for electronically providing the unique identifier has been discussed above, the skilled person will recognise that other electronic transmission means may alternatively be used, for example other optical recognition techniques, RFID, RF or optical transmitters.

Possible options for the portable access key may comprise a portable module, which may include a mobile or cellular telephone, portable digital assistant, an electronic watch. Such devices may be enabled to act as an access key when provided with suitable software in order to facilitate some of the features of the present invention. Alternatively, a badge, a ring, a wristband or device carried in a pocket could be employed. It will be recognised that some embodiments of the present invention require the portable access key to include electronic communication means, whilst other embodiments do not. Similarly, some embodiments of the present invention require the portable access key to include means readable by electronic systems, whilst other embodiments do not.

Advantageously, speed of operation is increased when either electronic communication means or means readable by electronic systems are available. Moreover, further features can be provided when either of these two technologies are provided. For example, these technologies may allow the portable access key to also provide other forms of access control, such as opening lockers, or electronic currency, as well as the features of the present invention.

A portable device could be an aid in location of a missing person such as a child. A supervisor or the missing person could flag the fact that they are lost to a central server, which may then cause an alarm to sound, for example if the missing person uses their portable module at an access barrier of an attraction. Additionally or alternatively, the portable modules of a group of users, for example children and parents, could be grouped so that no child is allowed to leave an amusement park or access an attraction without being accompanied by at least one parent from the group, and the last parent of the group to leave will be blocked if any children from the group remain in the amusement park.

Where the portable module includes reception means, the portable module may be able to provide other indicators to the user. For example, this may be used for reporting the access criterion for one or more attractions, problems with any attractions, advertising. The portable module may also include functionality to improve its operation. For instance, the portable module may include positioning determination means, such as GPS. This may be used for locating attractions and providing directions, as an example, or as an aid to finding a missing person.

Where the variable access parameter is a number, a transfer of quantity from a first portable module to a second portable module could be allowed. This may be limited to transfer within a defined group of portable modules (such as those of a family), or allowed for all portable modules. For instance, a couple, each with a variable access parameter of 30, could combine their variable access parameters, so that one of them would have a variable access parameter of 60 and the other a variable access parameter of zero. The user with the variable access parameter of 60 could then access any attraction with an access criterion threshold set at 60 or below, rather than 30 or below.

When designing an access barrier 20 and an associated access queuing area, it is important to provide enough capacity so that users having an associated variable access parameter that is sufficient to pass through the access barrier 20 are rarely or never blocked from doing so by other guests. For example, if the access queuing area were to become full, and this prevented eligible guests from entering the access area, it would probably lead to an uncontrolled queue forming before the access barrier 20. If this happened with any regularity, guests would learn that there is an advantage to be gained by joining this uncontrolled queue before their variable access parameter met the access criterion. The duration of this queue could potentially grow to a similar extent to the physical queue. The skilled person will therefore recognise the advantages in providing sufficient space in the access queuing area to allow as many users to queue there as may be needed.

It is also desirable to prevent one user from obtaining multiple portable modules, and to block portable modules that have not been enabled for the current day from operation, so as to prevent one user obtaining an unfair advantage over other users.

The invention claimed is:

1. A system for regulating access to one or more resources by a plurality of users, the system comprising:

a plurality of portable access keys, each portable access key being provided to one of the plurality of users and having a variable access parameter associated therewith;

a subsystem for each of said one or more resources, comprising:

an access barrier, having an open state allowing passage through the access barrier and a closed state denying access to the resource, the access barrier defining an access queue;

a sensor, arranged to determine an access queue characteristic, related to a number of users in the access queue; and a detector, located at the access barrier and adapted to determine the variable access parameter of each of said portable access keys when the portable access key is brought into the vicinity of the detector;

a controller, arranged to set an access criterion for the access barrier of each of said one or more resources based on the determined access queue characteristic;

wherein the controller is further arranged to set the access barrier of each of said one or more resources in its open state if the variable access parameter determined by the detector meets the access criterion;

wherein the plurality of users do not need to pre-register to gain passage through the access barrier of each of said one or more resources;

wherein the variable access parameter of each of said portable access keys is defined as a number of units, and the access criterion for each of said resources is defined by a threshold level of said units; and wherein the controller is configured to adjust the threshold level in response to an adjustment in the access queue characteristic.

2. The system of claim 1, wherein the access queue characteristic is indicative of a waiting time of users in the access queue.

3. The system of claim 1, further arranged to adjust the variable access parameter associated with the detected portable access key if the access barrier is set to its open state.

4. The system of claim 1, wherein each of the plurality of portable access keys comprises a portable module comprising:

a memory, arranged to store the respective variable access parameter for the portable module;

a transmitter, arranged to transmit the variable access parameter associated with the portable module; and wherein the detector comprises a receiver arranged to receive the associated variable access parameter.

5. The system of claim 1, further comprising an entrance barrier, the entrance barrier and access barrier defining the access queue, and wherein the sensor is arranged to measure the number of users in the access queue.

6. The system of claim 5, wherein the sensor comprises: an entrance barrier counter, arranged to count the number of users passing through the entrance barrier and thereby leaving the access queue.

7. The system of claim 6, wherein each of the plurality of portable access keys has an associated identifier;

wherein the entrance barrier counter is arranged to count the number of users passing through the entrance barrier using a receiver arranged to receive the associated identifier from a portable access key;

wherein the detector at the access barrier comprises a receiver arranged to receive said identifier; and wherein the controller is further arranged to set the access barrier in its open state if the receiver of the detector receives an associated identifier and the variable access parameter determined by the detector meets the access criterion.

8. The system of claim 7, further arranged to adjust the variable access parameter associated with the portable access key from which the associated identifier is received at the entrance barrier.

9. The system of claim 7, wherein each of the plurality of portable access keys comprises a transmitter arranged to transmit the associated identifier.

10. The system of claim 1, wherein the sensor is arranged to determine a plurality of access queue characteristics, and wherein the controller is arranged to set the access criterion based on the plurality of access queue characteristics.

11. The system of claim 1, wherein the variable access parameter comprises a number and wherein, for each of the plurality of portable access keys, the system is arranged to measure the time elapsed since the respective variable access parameter was changed and to increase the respective variable access parameter based on the measured time elapsed.

12. The system of claim 1, wherein the variable access parameter comprises a number and wherein the controller is arranged to set the access criterion by determining a threshold and to set the access barrier in its open state if the variable access parameter determined by the detector meets the threshold.

13. A system for regulating access to a first resource and a second resource by a plurality of users, the system comprising:

a plurality of portable access keys, each portable access key being provided to one of the plurality of users and having a variable access parameter associated therewith;

a first access barrier, having an open state allowing passage through the access barrier and a closed state denying access to the first resource, the first access barrier defining a first access queue;

a first sensor, arranged to determine a first access queue characteristic, related to a number of users in the first access queue;

a first controller, arranged to set a first access criterion for the first access barrier based on the determined first access queue characteristic;

a first detector, located at the first access barrier and adapted to determine the variable access parameter of a portable access key when the portable access key is brought into the vicinity of the first detector;

a second access barrier, having an open state allowing passage through the second access barrier and a closed state denying access to the second resource, the second access barrier defining a second access queue;

a second sensor, arranged to determine a second access queue characteristic, the second access queue characteristic being related to a number of users in the second access queue;

a second controller, arranged to set a second access criterion for the second access barrier based on the determined second access queue characteristic;

a second detector, located at the second access barrier and adapted to determine the variable access parameter of a portable access key when the portable access key is brought into the vicinity of the second detector;

wherein the first controller is further arranged to set the first access barrier in its open state if the variable access parameter determined by the first detector meets the first access criterion;

wherein the second controller is further arranged to set the second access barrier in its open state if the variable access parameter determined by the second detector meets the second access criterion;

wherein the plurality of users do not need to pre-register for the first resource or second resource to gain passage through the first access barrier or second access barrier;

wherein the variable access parameter of each of said portable access keys is defined as a number of units, and the first access criterion and second access criterion are defined by a threshold level of said units; and wherein the first controller and second controller are configured to adjust the threshold level in response to an adjustment in the first access queue characteristic and second access queue characteristic.

14. A method for regulating access to one or more resources by a plurality of users, the method comprising:

providing a portable access key to each of the plurality of users, each portable access key having a variable access parameter associated therewith;

defining an access queue using an access barrier;

closing the access barrier so as to deny access to the resource;

determining an access queue characteristic, the access queue characteristic being related to a number of users in the access queue;

setting an access criterion for the access barrier based on the determined access queue characteristic;

determining the variable access parameter of a portable access key when the portable access key is brought into the vicinity of a detector in the access barrier;

opening the access barrier, to allow passage through the access barrier, if the variable access parameter determined by the detector meets the access criterion;

wherein the plurality of users do not need to pre-register for the resource to gain passage through the access barrier;

wherein the variable access parameter of each of said portable access keys is defined as a number of units, and the access criterion is defined by a threshold level of said units; and wherein the threshold level is adjusted in response to an adjustment in the access queue characteristic.

15. The method of claim 14, further comprising: adjusting the variable access parameter for a user passing through the opened access barrier.

16. The method of claim 14, wherein the variable access parameter comprises a number, the method further comprising:

measuring, for each of the plurality of users, the time elapsed since their respective variable access parameter was changed; and increasing, the variable access parameter for each of the plurality of users, based on the respective measured time elapsed.

17. A method of regulating access to one or more resources by a plurality of users, the method comprising:

defining a plurality of variable access parameters, each variable access parameter being associated with a respective user from the plurality of users;

determining an access queue characteristic, the access queue characteristic relating to a number of users wishing to access the resource who are waiting in an access queue;

allowing a user from the plurality of users to access the resource if the variable access parameter for said user meets an access criterion, the access criterion being based on the determined access queue characteristic, to thereby regulate access to the resource;

wherein the plurality of users do not need to pre-register for the resource to gain access to the resource;

wherein each variable access parameter is defined as a number of units, and the access criterion is defined by a threshold level of said units; and wherein the threshold level is adjusted in response to an adjustment in the access queue characteristic.

18. The method of claim 17, wherein the access queue is defined by an access barrier and wherein the step of allowing a user to access the resource comprises opening the access barrier.

19. The method of claim 18, further comprising: adjusting the variable access parameter for a user passing through the opened access barrier.

20. The method of claim 17, wherein the variable access parameter comprises a number, the method further comprising:

measuring, for each of the plurality of users, the time elapsed since their respective variable access parameter was changed; and increasing, the variable access parameter for each of the plurality of users, based on the respective measured time elapsed.

* * * * *